UNITED STATES PATENT OFFICE.

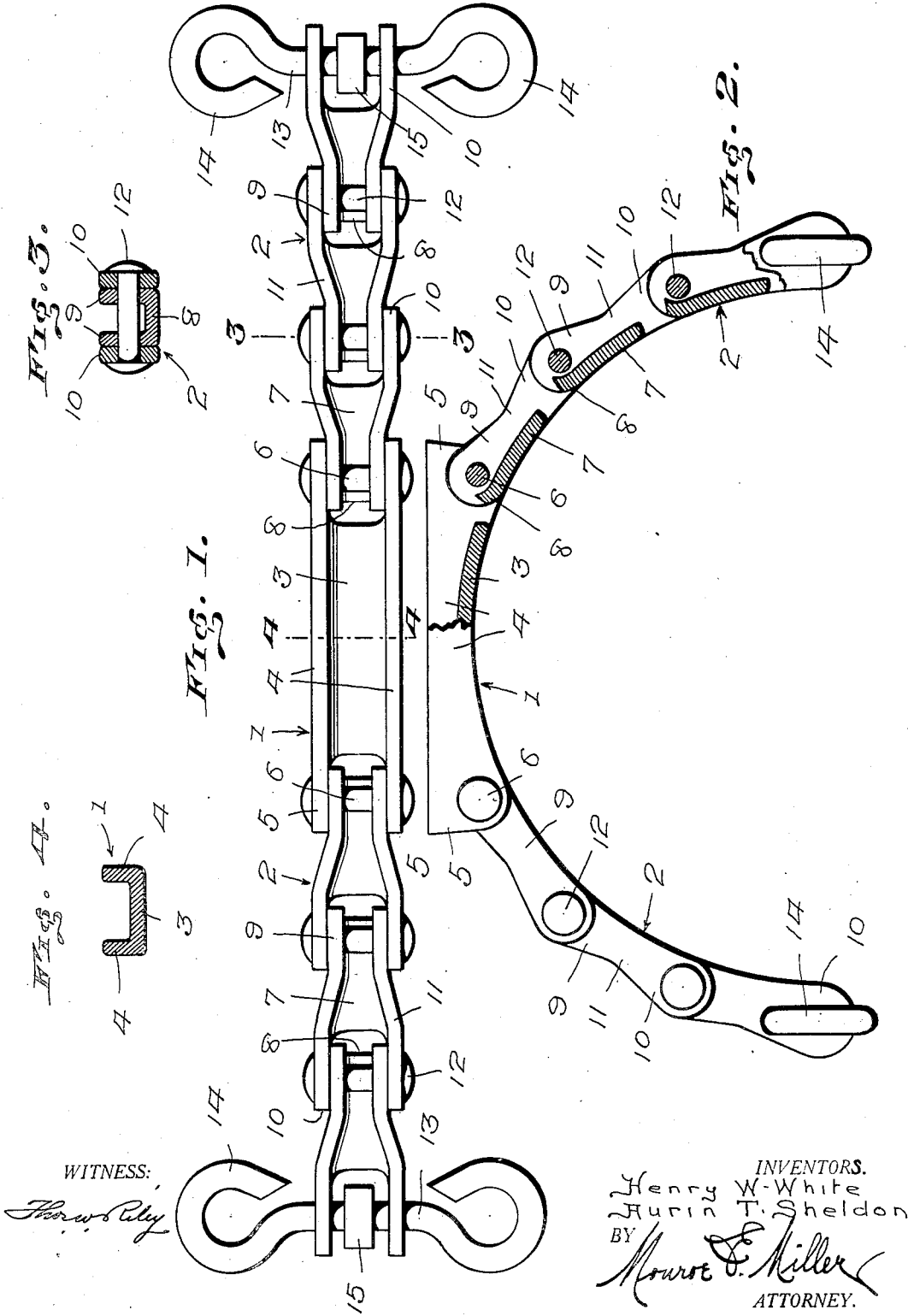

HENRY W. WHITE AND AURIN T. SHELDON, OF MOLINE, ILLINOIS.

ANTISKID DEVICE.

1,336,175.  Specification of Letters Patent.  Patented Apr. 6, 1920.

Application filed December 2, 1918. Serial No. 265,004.

*To all whom it may concern:*

Be it known that we, HENRY W. WHITE and AURIN T. SHELDON, citizens of the United States, and residents of Moline, in the county of Rock Island and State of Illinois, have invented certain new and useful Improvements in Antiskid Devices, of which the following is a specification.

The present invention relates to anti-skid attachments for vehicle wheels, such as are used on pneumatic tires, and this invention is an improvement over an anti-skidding device shown in our copending application filed December 15, 1916, Serial No. 136,735.

The present invention relates more particularly to one of the transverse chain units of such an anti-skid device, which unit extends transversely across the tread of the tire to facilitate traction and prevent slipping and skidding, it being the object of the invention to provide such a unit or chain section of novel and improved construction, whereby to present great strength, to effectively prevent slipping and skidding, and to prevent the chafing or injuring of the tire.

A further object of the invention is the provision of such a chain, the links of which are formed and assembled in novel manner, whereby each link as well as the chain unit will bear against the tire with a broad bearing surface, to prevent chafing of the tire, and in order that the links present to the road or surface traversed especially effective means to facilitate traction and prevent skidding, the chain being thoroughly flexible so as to yield with the tire.

A still further object is the provision of such a chain, the links of which can be readily stamped and bent from sheet metal stock, and which when assembled will constitute a chain unit of maximum strength and durability, as well as efficiency for the intended purposes.

With the foregoing and other objects in view, which will be apparent as the nature of the invention is better understood, the invention resides in the construction and assemblage of the component elements, it being understood that changes can be made within the scope of what is claimed without departing from the spirit of the invention.

The invention is illustrated in the accompanying drawing, wherein—

Figure 1 is a plan view of the chain unit laid out flat.

Fig. 2 is an elevation thereof in the position as when extending transversely across the tread of a tire, the curvature depending upon that of the tire.

Figs. 3 and 4 are cross sectional details taken on the respective lines 3—3 and 4—4 of Fig. 1.

The chain unit illustrated in the drawing, is one of a series to extend transversely across the tire to fit the tread and sides thereof, the ends of these units being connected to annular side retainer chains to hold the units snugly in place on the tire. The chain unit is composed of a central or intermediate link 1 which is sufficiently long to extend across the tread proper of the tire, and a number or series of short links 2 are disposed beyond both ends of the central long link 1, although the arrangement of the links may be varied from the particular arrangement shown. Both the links 1 and 2 are preferably stamped from heavy sheet metal stock and formed under dies into the desired shape, which will presently appear, although these links can be cast, forged or otherwise manufactured. In stamping and bending the links from sheet metal, however, this facilitates the manufacture and also gives the links maximum strength and wear-resisting properties.

The link 1 is of channel-shape, being provided with a longitudinally curved web 3 to snugly fit the tread of the tire, and flanges 4 extend outwardly or upwardly from the web 3 along the longitudinal edges thereof at substantially right angles with the web. The ends of the flanges 4 project beyond the ends of the web 3 to provide the lobes 5 which are rounded so as not to chafe the tire. The edges of the flanges 4 are preferably straight to bear evenly on the road or surface traversed, and the ends of the flanges 4 are at an angle with their edges, to present sharp corners, so as to prevent skidding sidewise. The flanges 4 not only provide means or edges to engage the road for facilitating traction and preventing slipping, but also strengthen and stiffen the link 1, and with the web 3 give said link great strength, the wear coming on the flanges 4 which are turned away from the tire, while the web 3 bearing against the tire will not chafe or injure it. The flanges 4 extend outward from the convex side of the web 3, and with the web take up the strains to which the chain is subjected.

The links 2 are of somewhat similar formation, being of channel-shape and having the web 7 curved longitudinally to comfortably fit the respective sides of the tire. Each link 2 is provided with flanges 9 extending outwardly at substantially right angles from the web 7 along the longitudinal edges thereof, and one end of the web 7 is reduced in width as at 8, while the opposite ends of the flanges 9 project beyond the opposite end of the web 7 to form the lobes 10 which are in substantial alinement with the lobes of the other links so that the traction- and anti-slipping means extends from one link to another, it being noted that when the chain is pressed into soft ground, or the tire flattened, the flanges 9 will engage the underlying roadbed or surface similar to the flanges 4. The ends of the flanges 9 are rounded so as not to chafe the tire, and those ends of the flange 9 at the narrower ends 8 of the webs 7 are offset inwardly and located closer together than the lobes 10, as seen in Fig. 1, the flanges 9 having oblique offset portions 11 intermediate their ends serving to brace said flanges. The links 2 can be readily struck from sheet metal stock and pressed into shape between suitable dies, and when in final form will have considerable strength. The narrower ends of the links 2 project snugly into the bifurcated ends of the companion links for pivotally connecting them. Thus, rivet or pivot elements 6 extend transversely through the lobes or end portions 5 of the flanges 4 and serve as stays for the flanges 4, and those links 2 adjacent to the ends of the link 1 have the narrower ends 8 of the webs 7 extending between the lobes 5 close to the ends of the web 3 across and underneath the rivets 6 to the ends of the corresponding flanges, and the respective ends of the flanges 9 of said links 2 pivotally embrace the rivets 6 and fit closely against the inner sides of the lobes 5. Similarly, the narrower ends 8 of the webs 7 of the other links 2 extend snugly between the corresponding lobes or end portions 10 of the companion links 2, and their flanges 9 pivotally embrace transverse rivets or pivot elements 12, engaging through the lobes or end portions 10 of the corresponding flanges, these rivets 12 also serving as stays for the lobes or portions 10. The links 1 and 2 are therefore pivotally or flexibly connected to yield with the tire, and the webs 7 are close together with little space between the ends thereof, so that there is no possibility of the edges of the links cutting the tire, the edges and ends of the webs being rounded off. The flanges 9 of the links 2, like the flanges 4 of link 1, present the edges of the metal to the road so as to facilitate traction and prevent slipping, and also strengthen and stiffen the links 2 and take up the strain in a most effective manner. Although the chain unit is of rugged construction, it will not harm the tire like anti-skid chains now used, and the tractive and anti-skidding properties are superior thereto. The formation of the links having the flanges integral with the webs and jointed by the rivets or pivot elements as shown and described, lend considerably to the durability and life of the chain, the wear being imposed on the edges of the material which are bent outwardly to engage the road, and said outstanding portions or flanges, at the same time, add strength to the links and take up the strain.

In order that several of the chain units can be assembled, rods 13 extend through the lobes or end portions 10 of the endmost links 2. These rods 13 have terminal eyes or hooks 14, which through other rods or links can be coupled to the rods 13 of the other units. It is preferable to provide collars 15 on rods 13 between the respective flanges 9, and said collars 15 can be shrunk or otherwise secured on the rod 13 to limit the relative motion of the chain unit and rod 13 and prevent undue displacement thereof.

Having thus described the invention, what is claimed as new is:—

1. An anti-skid chain including a series of links to extend transversely across the tire, each link having a web to fit the tire and flanges extending outwardly at an angle from the outer side of the web along the longitudinal edges thereof to provide anti-slipping traction means and to also strengthen the links and take up strains, said flanges providing a continuation of said anti-slipping traction means from one link to another, pivot elements extending through end portions of said flanges, one end of each web extending between the flanges of the companion links, and said flanges having outwardly projecting portions integral with the said ends of the webs embracing said pivot elements.

2. An anti-skid chain including a series of links to extend transversely across a tire, each link having a longitudinally curved web to fit the tire and flanges extending outwardly at an angle from the convex side of the web along the longitudinal edges thereof to provide anti-slipping traction means and to also strengthen the links and take up strains, said flanges of the links having end portions projecting beyond corresponding ends of the webs, pivot elements extending through the projecting end portions of said flanges, the other ends of the webs being reduced in width to extend between said projecting end portions of said flanges, said flanges having outwardly projecting portions integral with the reduced portions of the webs pivotally embracing said pivot elements, said flanges being offset between their ends to strengthen the links.

3. An anti-skid chain including a long intermediate channel-shaped link having a web to fit transversely across the tread of a tire and flanges extending outwardly at an angle from the outer side of the web along the longitudinal edges thereof to provide anti-slipping traction means and to also strengthen the link and take up strains, and short links at the opposite ends of the long link and having webs to fit the sides of the tire and flanges extending outwardly at an angle from the outer sides of the webs along the longitudinal edges thereof and forming continuations of said anti-slipping traction means and to also strengthen the short links and take up strains, and pivot elements extending through the end portions of the flanges of the long link, the ends of the webs of the short links adjacent to the long link extending between the end portions of the flanges of the long link, the flanges of the short links having outwardly projecting portions integral with the webs of the short links between the ends of the flanges of the long link and said portions embracing said pivot elements.

4. An anti-skid chain including a long intermediate channel-shaped link having a longitudinally curved web to fit transversely across the tread of a tire and flanges extending outwardly at an angle from the convex side of the web along the longitudinal edges and beyond the ends thereof, to provide anti-slipping traction means and to also strengthen the link and take up strains, short links at the opposite ends of the long link and having longitudinally curved webs to fit the sides of the tire and flanges extending outwardly at an angle from the convex sides of the webs along the longitudinal edges thereof and having portions in substantial alinement with the flanges of the long link to form continuations of said anti-slipping traction means and to also strengthen the short links and take up strains, and pivot elements extending through the end portions of the flanges of the long link, the ends of the webs of the short links adjacent to the long link being reduced in width and extending between the ends of the flanges of the long link, the flanges of the short links having outwardly projecting portions integral with the reduced portions of the webs of the short links and said portions pivotally embracing said pivot elements, the flanges of the short links being offset between their ends to strengthen the links.

5. An anti-skid chain including a series of links to extend transversely across a tire, said links being of channel-shape and having webs to bear against the tire and flanges bent outwardly at an angle from the webs along the longitudinal edges thereof to provide anti-slipping traction means and to also strengthen the links and take up strains, said flanges having end portions offset toward one another and extending between and overlapping the end portions of the flanges of the companion links, said webs having reduced end portions integral with said offset portions of the flanges and extending between the adjacent end portions of the flanges of the companion links.

In testimony whereof we hereunto set our hands.

HENRY W. WHITE.
AURIN T. SHELDON.